United States Patent
Martinez et al.

(10) Patent No.: US 6,382,022 B1
(45) Date of Patent: May 7, 2002

(54) SHIPBOARD WAVE MEASUREMENT SYSTEM

(75) Inventors: Andrew B. Martinez, New Orleans; Brian S. Bourgeois, Slidell, both of LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/534,965

(22) Filed: Mar. 27, 2000

(51) Int. Cl.[7] .............................................. G01C 21/00
(52) U.S. Cl. .................................................... 73/178 R
(58) Field of Search .............................. 73/178 R, 181, 73/182, 183, 170.11, 170.14; 342/26, 192; 343/5 CE, 5 SA, 5

(56) References Cited

U.S. PATENT DOCUMENTS

| | | | | |
|---|---|---|---|---|
| 3,953,823 A | * | 4/1976 | Katakura | 340/1 R |
| 4,053,886 A | * | 10/1977 | Wright | 343/5 W |
| 4,054,879 A | * | 10/1977 | Wright | 343/5 SA |
| 4,633,255 A | * | 12/1986 | Trizna | 342/192 |
| 5,628,322 A | * | 5/1997 | Mine | 128/661.08 |

* cited by examiner

Primary Examiner—William Oen
(74) Attorney, Agent, or Firm—John J. Karasek; John G. Mills

(57) ABSTRACT

The shipboard wave measurement system (SWMS) makes measurements as a function of time of vehicle position, range from the vehicle to the water's surface, and vehicle heave, pitch and roll to compute the height, direction, period and wavelength of the principal ocean wave component. Since the vehicle is moving, the wave heights measured are at different spatial locations, as well as at different times, and the observed wave height signal is Doppler shifted. The SWMS is composed of a positioning device, a timing device, a wave height estimator (WHE), a Doppler Integrator (DI) and a computer. The positioning device measures the vehicle's position, the timing device provides accurate time referencing for the vehicle position and wave height measurements. The wave height estimator measures range to the water's surface from the vehicle and vehicle vertical acceleration, pitch and roll and generates wave height at specific instants of time. The Doppler integrator receives the time referenced wave height signal from storage and generates the frequency and height of the principal wave component, both as a function of time. Wave direction, period and wavelength are determined from the wave frequency and vehicle position data using a least-squares approach.

25 Claims, 7 Drawing Sheets

SHIPBOARD WAVE MEASUREMENT SYSTEM

BACKGROUND OF THE INVENTION

1. Field of the Invention

This invention pertains generally to a device for determining the height, direction, period and wavelength of the principal ocean wave component, and more particularly to making measurements on a moving surface or subsurface vehicle.

2. Description of the Related Art

The current methods for determining the height, direction, period and wavelength of the principal ocean wave component require the use of moored or bottom mounted instrumentation systems whose primary disadvantage is that they are costly and time consuming to deploy and recover, and are thus only suitable for making measurements in a single location. The moored systems cannot directly measure wavelength since wave height is only measured at a single point.

Bottom mounted systems use an array of pressure sensors that provide full spectrum measurement of wave height, direction, period and wavelength. These systems are only effective in shallow water where the pressure effects of the surface waves can be sensed on the bottom.

Small buoys, such as a wave rider, can be used in moderately deep water. These buoys are allowed to swing around their moorings and a heading sensor is used to determine wave direction.

Permanently moored large buoys, such as those used by NOAA, measure wave height and provide coarse measurement of wave direction.

SUMMARY OF THE INVENTION

The object of this invention is to provide a device for measuring the height, direction, period and wavelength of the principal ocean wave component on a moving surface or subsurface vehicle.

This and other objectives are achieved by the shipboard wave measurement system (SWMS) that makes measurements as a function of time of vehicle position, range from the vehicle to the water's surface, and vehicle heave, pitch and roll to compute the height, direction, period and wavelength of the principal ocean wave component. Since the vehicle is moving, the wave heights measured are at different spatial locations, as well as at different times, and the observed wave height signal is Doppler shifted. The SWMS is composed of a positioning device, a timing device, a wave height estimator (WHE), a Doppler Integrator (DI) and a computer. The positioning device measures the vehicle's position, the timing device provides accurate time referencing for the vehicle position and wave height measurements. The wave height estimator measures range to the water's surface from the vehicle and vehicle vertical acceleration, pitch and roll and generates wave height at specific instants of time. The Doppler integrator receives the referenced wave height signal from storage and generates the frequency and height of the principal wave component, both as a function of time.

DESCRIPTION OF THE PREFERRED EMBODIMENT

Figure 1:
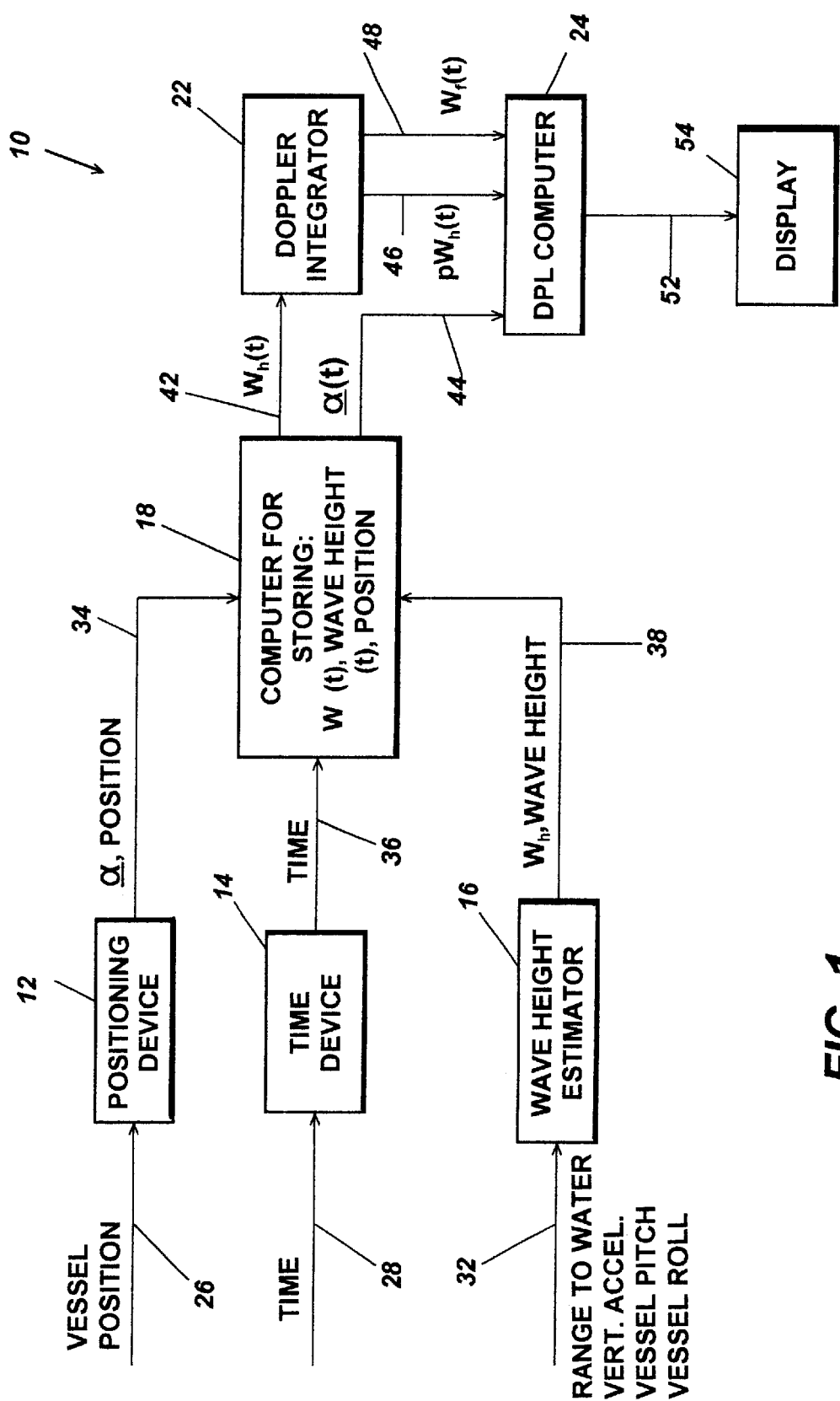
FIG. 1 shows a block diagram of a shipboard wave measurement system (SWMS).

The shipboard wave measurement system (SWMS) 10, as shown in FIG. 1, makes measurements as a function of time of vessel position, range from the vessel to the water's surface, and vessel heave, pitch and roll to compute the height, direction, period and wavelength of the principal ocean wave component. Since the vessel is moving, the wave heights measured are at different spatial locations, as well as at different times, and the observed wave height signal is Doppler shifted.

The shipboard wave measurement system (SWMS) 10 is comprised of the following: (1) a positioning device 12, which receives the vessel's current position 26; (2) a time device 14, which provides accurate time 28 referencing for the vessel position and wave height measurements, preferably from a GPS receiver, however, a computer clock may be used to generate measurements of the vessel's position as a function of time or any other time device having similar accuracy. (3) a wave height estimator (WHE) 16 for measuring range to the water's surface from the vessel and vessel vertical acceleration, pitch and roll and generates wave height, $W_h$, at specific instants of time; (4) a computer 18 for storing wave height and vehicle position as functions of time; (5) a doppler integrator (DI) 22 for receiving the time referenced wave height signal, $W_h(t)$, from storage and generates the frequency, $W_f(t)$, and height $pW_h(t)$, of the principal wave component, both as a function of time; and (6) a Doppler position linear regression (DPL) computer 24 which receives the time referenced vehicle position, $\alpha(t)$, from the storage computer 18 and the frequency of the principal wave component, $W_f(t)$, from the DI 22 and generates the direction, period and wavelength of the principal wave component 52.

The positioning device 12, measures the vehicle's position 26, denoted by $\alpha$, at specific instants in time, where $\alpha$ is a two dimensional vector quantity (e.g., latitude and longitude). The positioning device 12 is typically a global positioning system (GPS) satellite receiver, such as a TASMAN, manufactured by Trimble Navigation, located in Sunnyvale, Calif., however, an electronic/inertial navigation system or similar device with similar accuracy on the order of 5 meters, may be utilized.

The time device 14 is used to provide accurate time referencing for the vehicle position and wave height measurements. The time device 14 typically is a GPS satellite receiver, as above, that provides an accurate time 28 from the GPS satellite, however, it may be any other system with similar accuracy, such as a computer clock.

Figure 2:
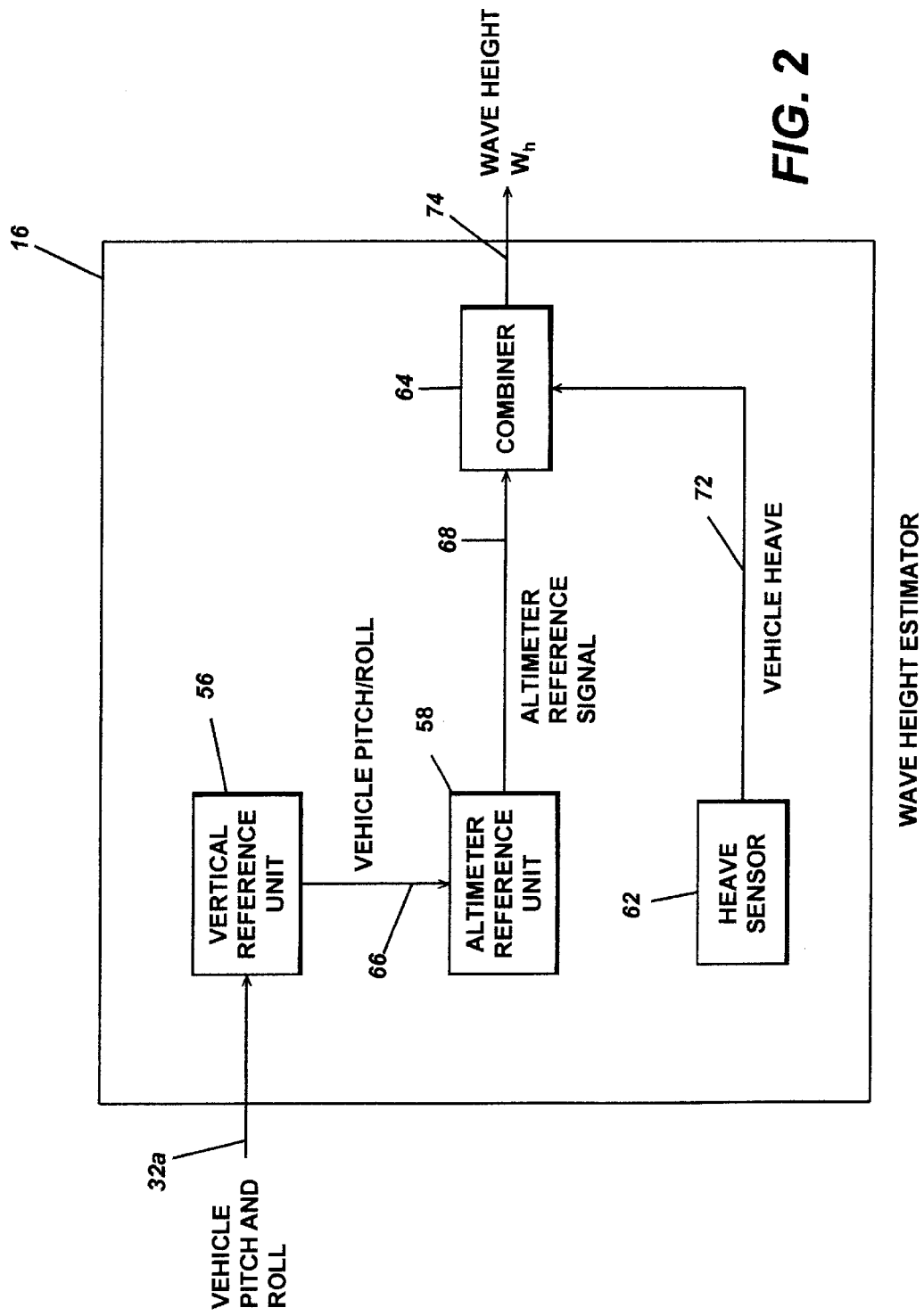
FIG. 2 shows a block diagram of a wave height estimator.

The WHE 16, as shown in FIG. 2, measures range to the water's surface from the vehicle and vehicle vertical acceleration, pitch and roll and generates wave height, $W_h$, at specific instances in time. The WHE 16 is composed of a vertical reference unit (VRU) 56, an altimeter reference unit (ARU) 58, a heave sensor 62 and a combiner 64. When coupled with the timing device 14, the WHE 16 generates measurements of the Doppler shifted wave height as a function of time 38.

The VRU 56 uses earth gravity to measure vehicle pitch and roll 32a with respect to vertical and outputs 66 measurements of vessel pitch and roll with respect to vertical. The VRU 56 may be a device such as a POS/MV 320 system manufactured by Applied Analytics, located in Markham, Ontario, Canada.

Figure 3:
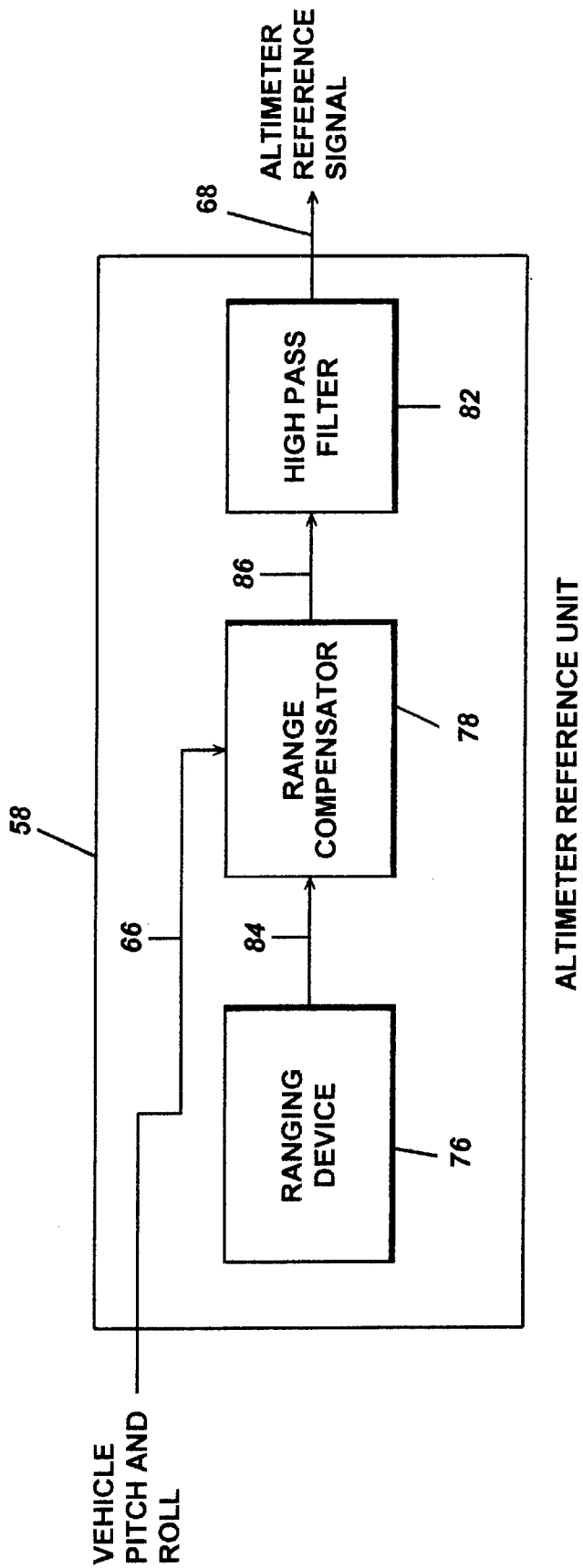
FIG. 3 shows a block diagram of an altitude reference unit.

The altimeter reference unit (ARU) 58, as shown in FIG. 3, measures the range to the water's surface and receives vehicle pitch and roll and generates an altimeter reference signal. The ARU 58 typically is an analog or digital device and is composed of a ranging device 76, range compensator 78 and a high pass filter 82.

The ranging device 76 is used to measure $r_{meas}$, the instantaneous range from a fixed point on the vessel to the ocean surface as a function of time. Measurement of range is accomplished by measuring the time required for a transmitted pulse to travel from the device to the surface and back to the ranging device 76; the pulse would typically be acoustic for the ranges considered herein. The ranging device 76, preferably is a combined digital and analog device, however, an device that is totally analog or digital may be used. The ranging device 76 for a surface vessel application, such as a Level Metrics 2002, manufactured by UltraSound Solutions, located in Albany, N.Y., or equivalent device may be used. For a subsurface vessel, a device, such as a ST5000 Precision Altimeter, manufactured by Tritech Intl., Ltd., located in Aberdeen, Scotland, United Kingdom, or an equivalent, may be used.

The mounting of the ranging device 76 requires the following considerations: for the surface vessel, the ranging device 76 must be oriented so that its beam strikes the water's surface clear of the vessel's wake; the wake would cause an erroneous offset in the measured range. Typically this requirement will exclude mounting on the sides or the stern of the vessel. For Bow mounting, the ranging device 76 must be oriented so that its beam strikes the water's surface ahead of the bow wake. Proper mounting for surface vessels can be accomplished by angling the ranging device 76 so that it projects ahead of the vessel, or by placing the ranging device 76 on a rigid structure extending far beyond the bow wake contamination. If a subsurface vessel travels near the surface of the water, then the vessel may leave a wake. The ranging device 76 must be oriented so that its beam strikes the water's surface clear of the vessel's wake; the wake would cause an erroneous offset in the measured range. Typically this can be accomplished by mounting the ranging device 76 far forward on the vessel.

Figure 4:
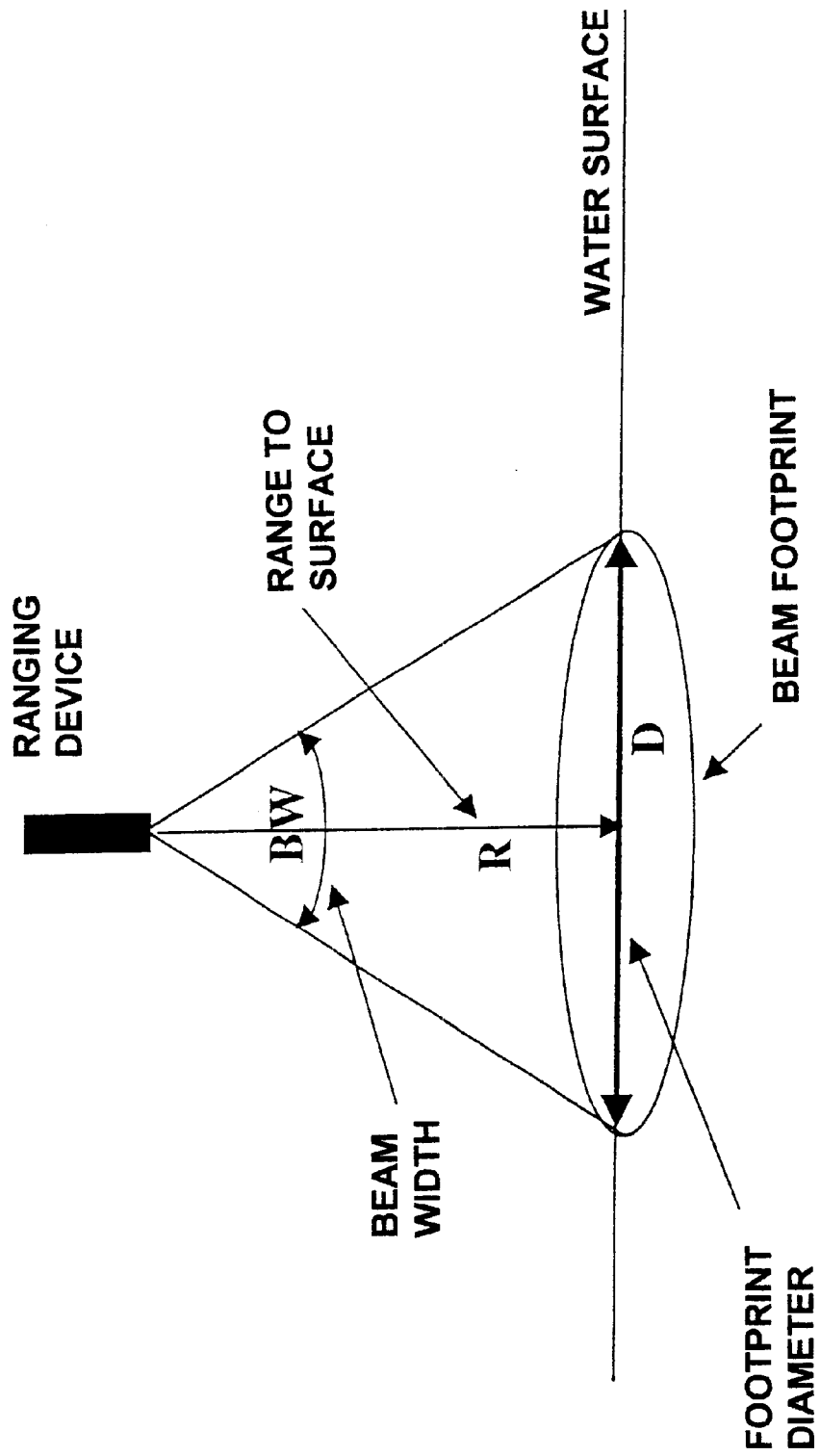
FIG. 4 shows the footprint and beamwidth of a ranging device.

In selecting the ranging device 76 for a particular implementation, the following should be considered:

(a) Beam width, for ranging devices, the beam is usually directional, resulting in a small angular beam width. A ranging device's 76 beam typically has a footprint that is circular when projected onto a flat surface perpendicular to the direction of the beam, as shown in FIG. 4.

The size of the beam's footprint is a function of the beam width and the range to the surface. The footprint's diameter is given by $D=2*R*\tan(BW/2)$, where D is the footprint diameter, R is the range to the surface, and BW is the angular beam width. The beam width of a device such as a Level-Metrics 2002 ranging device is 12 degrees. The beam width of a TriTech ST500 ranging device is 6 degrees. A beam width in the range of 5–30 degrees is adequate for most applications. Beam width considerations are:

(1) If the beam width is too narrow the beam may reflect off the water's surface in the opposite direction, and the ranging device would be unable to produce a valid range. This condition will be accentuated in very calm water.

(2) In general, a wider beam will not adversely impact the SWMS's 10 operation. A wider beam effectively acts as a low pass filter, filtering the measured signal and thus determines the minimum wavelength that is measurable. If the beam is very wide, then the vehicles bow wake or the vehicles hull could fall within the beam and contaminate the measured range signal.

(b) Range. For surface vehicles, the effective range of the ranging device 76 must be sufficient considering the size and bow configuration of the vehicle, the placement of the ranging device 76 on the vehicle, and the anticipated wave heights. For submerged vehicles, the effective range of the ranging device 76 must be sufficient considering the anticipated depth of the vehicle below the surface and the anticipated wave heights.

(c) Resolution and accuracy. The resolution and accuracy of the ranging device 76 dictates in part the accuracy of the wave height measurements. An accuracy of 5 cm or less is adequate for most implementations. The resolution should be smaller than the accuracy, 1 cm or less.

(d) Pulse repetition rate. Aliasing is an adverse phenomenon that occurs due to improper sampling of a signal and is well known to those skilled in the art. When aliasing occurs, high frequencies in the original signal are erroneously reproduced as low frequencies in the sampled signal: the effect is undetectable and uncorrectable in the sampled signal. In using the ranging device 76, aliasing of the measured range can be prevented by ensuring that the footprints from consecutive pulses overlap. For a maximum relative wave speed and the nominal range of the ranging device 76 from the water's surface, the footprint overlap can be increased by increasing the ranging device's 76 beam width, or by increasing the pulse repetition rate. The maximum relative wave speed is given by the sum of the maximum assumed vehicle speed and the maximum assumed wave speed. Ranging devices 76 will typically have fixed beam widths (governed by the physical transducer construction) but may have variable pulse repetition rates. For example, consider an implementation where the maximum relative wave speed is assumed to be 10 meters/sec (20 knots), the ranging device 76 is mounted 4 meters from the water's surface and the ranging device 76 has a 10 degree beam width. For this implementation a sampling rate of 15 samples/second is required to ensure beam footprint overlap.

Figure 5:
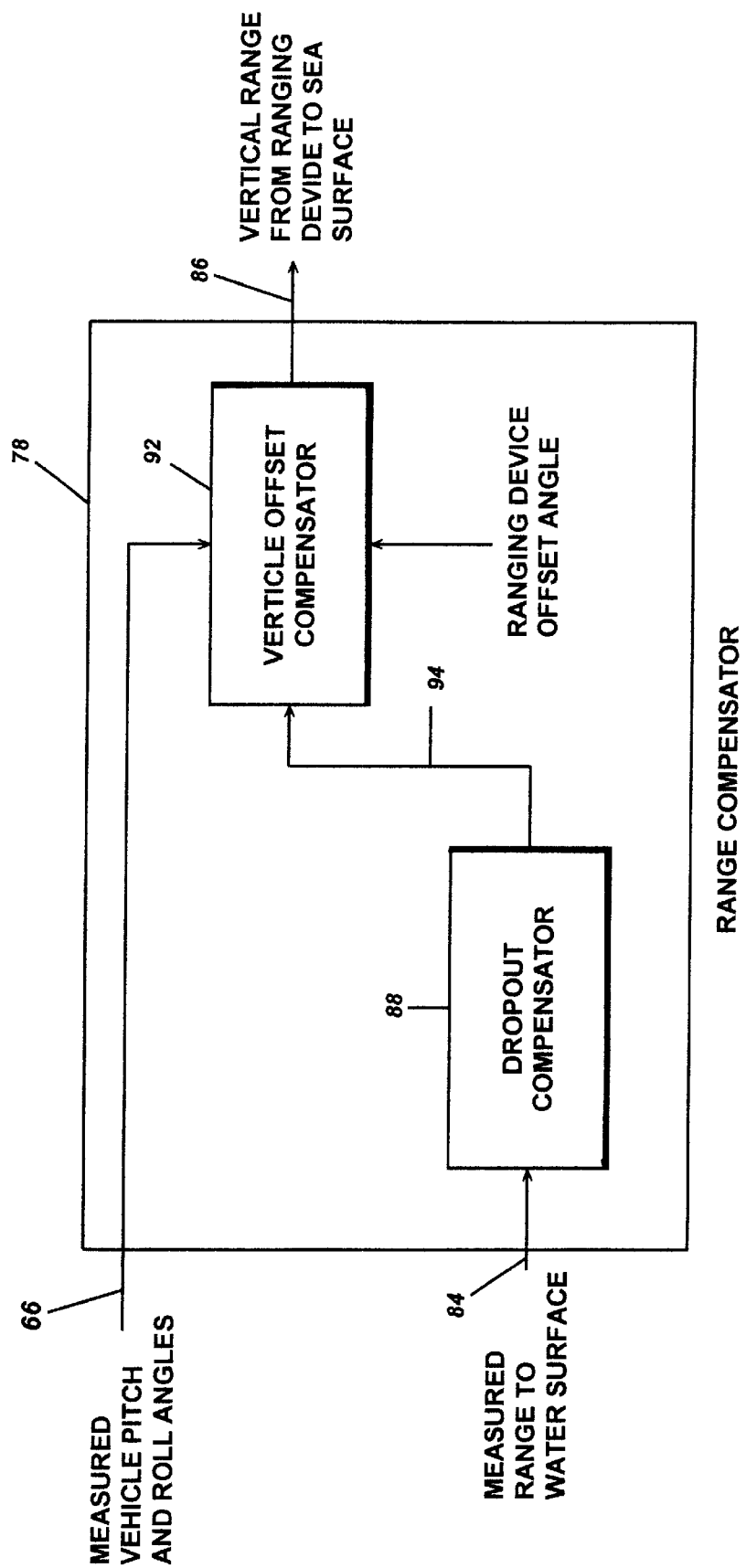
FIG. 5 shows a block diagram of a range compensator.

The range compensator 78, as shown in FIG. 5, has two functions: (1) correction for data dropouts and (2) correction for the error in the measured range due to non-vertical orientations of the ranging device 76. The range compensator 78 receives the range measurement 84 from the ranging device 76, $r_{heas}$, and outputs the vertical range 86 from the ranging device 76 to the ocean surface, $r_s$. The range compensator 78, as shown in FIG. 5, is composed of a dropout compensator 88 and a vertical offset compensator 92 and may be either an analog or digital device. In this discussion a digital device is portrayed.

The dropout compensator 88 receives the range measurement 84 from the ranging device 76, $r_{heas}$, and generates an output 94 free of data dropouts. Since the beam of the ranging device 76 may reflect off the ocean surface away from the sensor (particularly for smooth surfaces), data dropouts may occur. This problem may occur more often if the ranging device 76 has a fairly small beam width. To compensate for this, interpolation is used between adjacent good data points from the ranging device 76 to estimate the missing data points. Interpolation of sampled data is well known to those skilled in the art.

The vertical offset compensator 92 receives the dropout compensated signal 94 from the dropout compensator 88 and vehicle pitch and roll 66 from an external sensor (a vertical reference unit 56, as shown in FIG. 2, such as the POS/MV 320 previously discussed. The vertical offset compensator 92 outputs 86 the vertical range from the ranging device 76 to the ocean surface, $r_s$. The vertical offset compensator 92 corrects the error in range measured by the ranging device 76 for any offsets of the ranging device 76 from the vertical. Offsets from vertical may be due to the ranging device 76 mounting angle, θ, resulting in a constant offset angle from the vertical. Offsets from vertical may also be due to vehicle pitch and roll which will change with time. Compensation of a measured distance for an offset angle, θ, is well known to those skilled in the art.

Figure 6:
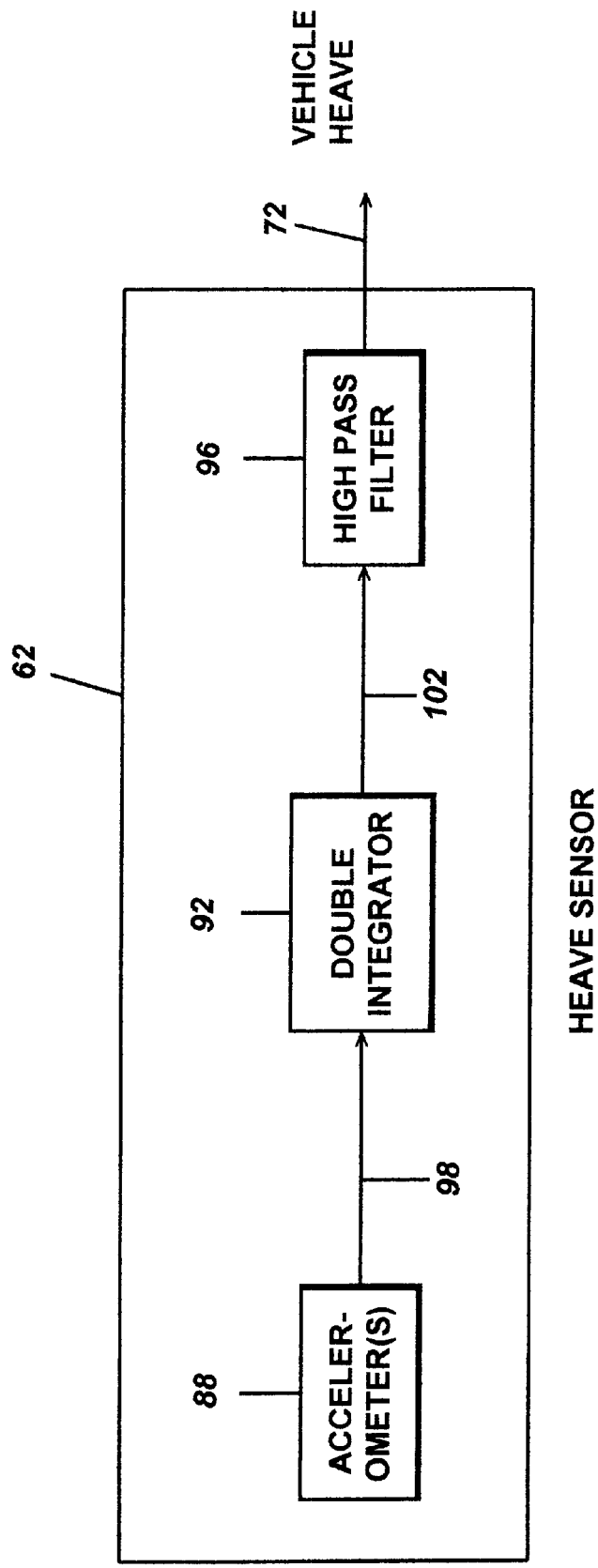
FIG. 6 shows a heave sensor.

Referring again to FIG. 3, the high pass filter 82 receives the corrected angle signal 86, $r_s$, as its input and outputs the altimeter reference signal 68. The corrected angle signal 86, $r_s$, contains three components: (a) the instruments vertical displacement of the vehicle (heave) from its mean path; (b) the offset from the mean path, referenced to the ranging device's 76 vertical location, to mean sea level; and (c) the vertical motion of the sea surface (wave height). The objective of the high pass filter 82 is to eliminate that component due to the offset of the mean path from mean sea level and to modify that component of $r_s$ that is due to the heave so that it exactly matches the heave signal measured by the heave sensor 62, as shown in FIG. 2. This is required so that the component in this signal 86 due to vehicle heave may be completely removed by the combiner 64. This objective is accomplished by ensuring this high pass filter's 82 frequency response exactly matches that of the high pass filter 96 used in the heave sensor 62, as shown in FIG. 6. The implementation of a filter in a system such as this is well known to those skilled in the art.

The heave sensor 62 measures the vehicle's vertical acceleration and generates a signal 72 that is the heave of the vehicle, which is its instantaneous vertical displacement from its mean path. The heave sensor 62 may be a device such as the POS/MV 320 system manufactured by Applied Analytics of Markham, Ontario, Canada. This sensor 62 may be an analog or digital device, the POS/MV utilized in the device set forth herein is a digital device. The typical heave sensor 62 shown in FIG. 6, is comprised of the accelerometer 88, a double integrator 92 and a high pass filter 96. The heave can be equally defined as that component of the vehicle's vertical displacement (with respect to a fixed vertical reference point) that is absent in the vehicle's mean path.

A typical heave sensor 62 uses accelerometers 88 to directly measure the vertical acceleration of the vehicle and outputs 72 measurements of the vessel's heave about its mean path. To obtain the vertical displacement this signal 98 is double integrated. Due to the double integration there are two unknown constants of integration and the average value of this signal 102 is thus meaningless and is removed in the heave sensor 62 using a high pass filter 96. The resulting signal (heave) 72 is the vertical signal about an unknown mean path. A heave of zero indicates no vertical displacement from this mean path.

If the heave sensor 62 is not collected with the ranging device 76, then the heave measured at the position of the heave sensor 62 may not be the same as at the position of the ranging device 76. If this is the case, then the heave data must be translated, using measured vehicle pitch and roll, to compute the heave of the vehicle at the location of the ranging device 76. Given measured pitch and roll, translation of the heave measurement is well known to those skilled in the art.

Figure 7:
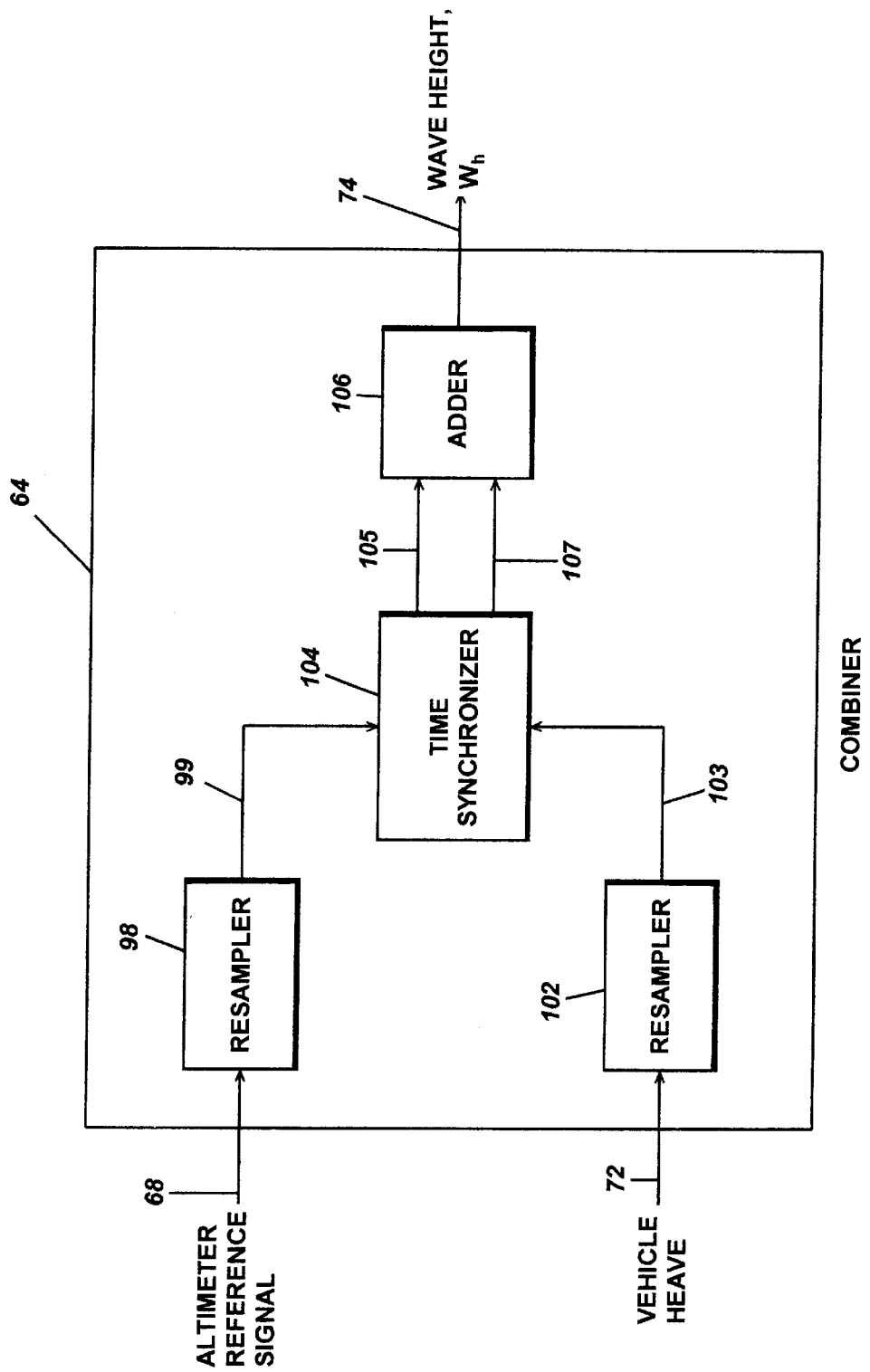
FIG. 7 shows a block diagram of a combiner.

The combiner 64 shown in FIG. 7 takes the heave signal 72 and the altimeter reference signal 68 and generates a signal that is the wave height, $W_h$. The combiner may be an analog or digital device. For the device taught herein it is a digital device. The combiner 64 is comprised of two resamplers 98 and 102, a time synchronizer 104 and an adder 106. It is noted that the operations of resampling and time synchronization would not be necessary for an analog implementation.

The resamplers 98 and 102 perform resampling of the altimeter reference signal 68 and heave signal 72, respectively, if necessary, to ensure these two data streams are at the same sampling rate. The two data streams must have the same sampling rates to allow subsequent time synchronization and addition of the resulting signals 99 and 103. This operation is not necessary if the altimeter reference signal 68 and the heave signal 72 are originally sampled at the same rate. The input of the resampler is either (1) the altimeter reference signal 68 or (2) the vehicle heave signal 72, sampled at a specific sampling rate. For this implementation of the SWMS 10, the specific sampling rate is 10 samples/second. Resampling of data streams is well known to those skilled in the art.

The time synchronizer 104 synchronizes the altimeter reference signal 68 stream and the vehicle heave signal 72 for subsequent addition. This operation is required so that the addition operation will add the heave data samples and the altimeter reference data samples that correspond to the same instances in time. This operation is not necessary if the altimeter reference data and heave data are originally sampled at the same instants in time. The inputs to the time synchronizer 104 are the re-sampled altimeter reference signal 99 and the resampled vehicle heave signal 103. Time synchronization of data signals is well known to those skilled in the art.

The adder 106 adds the resampled and time synchronized altimeter reference signal 105 and the additive inverse (i.e., multiplied by −1) of the resampled and time synchronized vehicle heave signal 107 at each instant in time. The effect of this addition is to exactly cancel that component of the altimeter reference signal that is due to the vehicle's heave. The result of this addition operation is a signal that is the Doppler shifted wave height as observed by the vehicle while it is moving through the water. Addition of two sampled signals is well known to those skilled in the art.

Referring again to FIG. 1, the computer 18 for storing stores the wave height 42, Wh(t), and vehicle position 44, α(t), measurements as functions of time received from the positioning device 12 and WHE 16.

The Doppler integrator (DI) 22 receives the time referenced wave height signal 42, Wh(t) from storage in the computer 18 and generates the frequency, $W_f(t)$, and height, $pW_h(t)$ of the principal wave component, both as a function of time. The DI 22 may be an analog or a digital device, however, for this embodiment of the invention it is a digital device.

Since the vehicle is moving through the ocean, the observed spectra of the ocean surface height signal, Wh(t), is Doppler shifted. Consequently, the frequency spectrum of the signal changes as the vehicle's heading or speed is changed relative to the direction and speed of the principal ocean wave component. It is assumed here that the ocean wave conditions do not change appreciably with time or vehicle position in the sampling intervals considered. In the cases where there is a single dominant peak in the spectra, i.e., the principal wave component, it is possible to track the frequency of this component as it changes with vehicle heading and speed. Determining whether or not a signal has a single dominant spectral peak is well known to those skilled in the art.

There are three distinct steps involved in determining the frequency, $W_f(t)$, and height, $pW_h(t)$, of the principal wave component: (1) data collection, (2) estimation of the Doppler shifted frequency of the ocean wave principal component, $W_f(t)$, and (3) estimation of the principal component's height, $_{p.H.}(t)$.

To collect the wave height data for subsequent determination of the principal component frequency, $W_f(t)$, two sampling approaches are available.

(a) Running the vehicle on a fixed heading and at a fixed speed. With this approach a constant Doppler shifted frequency is assumed and a single principal component frequency is estimated for the entire time. For each line run in this fashion, a single Doppler shifted frequency and a single vehicle velocity is obtained. Note that the vehicle's velocity is a vector value consisting of both vehicle heading and speed.

(b) Running the vehicle on an arbitrary course and at an arbitrary speed. With this approach, the Doppler shifted frequency of the principal wave components, $W_f(t)$, may vary with time as the velocity of the vehicle changes. With this approach a Doppler shifted frequency and a vehicle velocity are obtained at each instant of time.

In order to determine the Doppler shifted frequency of the principal wave component from the wave height signal 74, approaches are required that provide good noise immunity as well as frequency estimation precision. Two alternative approaches are illustrated here, although other approaches are available for the task of frequency estimation of a sampled signal. The approaches selected here are MUSIC and demodulation, a technique well known to those skilled in the art.

MUSIC is an eigen-based, high-resolution estimator for spectral peaks that returns a single spectrum for a given sampled data series. Application of MUSIC to a sampled signal to obtain the frequency (i.e., principal wave observed frequency) of the principal component is well known to those skilled in the art. MUSIC may be applied when the fixed heading/speed sampling approach is used.

Demodulation can be used to determine the principal component's frequency with signals that are relatively narrow-band and have a strong spectral peak. Given a sampled signal, demodulation returns data series that are (1) the frequency ($W_f(t)$) and (2) the magnitude ($_{p.H.}(t)$) estimated of the principal wave component frequency at each instant in time. Demodulating a sampled signal to obtain the signal's principal component frequency and magnitude, as a function of time, is well known to those skilled in the art. Demodulation may be applied to either the fixed heading/speed sampling approach or to the arbitrary heading/speed sampling approach.

Note that a complication with frequency estimation arises if the vehicle outruns the principal ocean wave front, which occurs if the vehicle is moving faster than the wave front and in the same direction. Conceptually, this situation should result in a negative observed frequency. However, since the wave height sampling approach is scalar in nature this will result in the negative frequencies 'folding over' and appearing as positive frequencies in the wave height data. This situation can be resolved by conducting a circle pattern with the vehicle during data collection. If the vehicle is moving fast enough to outrun the principal wave component then the observed Doppler shifted frequency will be zero at the two points along the circular path where the vehicle is effectively stationary with respect to the moving wave front. The maximum observed Doppler shifted frequency occurs when the vehicle is moving in the opposite direction from the wave front. The maximum frequency and the two zero crossings of the observed Doppler shifter frequency can be used to unfold the observed frequency by making the frequency values corresponding to those directions where the vehicle is outrunning the wave front negative.

As previously discussed, the demodulation approach directly produces both the frequency and the height of the principal wave component, both functions of time. The MUSIC approach however, only produces a single frequency value for each line run by the vehicle. With the MUSIC approach the height of the principal wave component can be computed by base banding and low pass filtering the wave height data, $W_h(t)$, using the MUSIC computed frequency. Base banding and low pass filtering a signal is well known to those skilled in the art. The process will produce the principal component's height as a function of time, $_{p.H.}(t)$ The DPL computer 24 receives the time referenced vehicle position 44, $\alpha(t)$, from the storage computer 18 and the frequency of the principal wave component 48, $W_f(t)$, from the DI 22 and generates the direction, period and wavelength of the principal wave component 52 which can be displayed on a display 54 such as a video screen or x-y plotter.

In order to compute the parameters of the principal ocean wave component, the effect of the vessel's motion through the water must be accounted for in the sampled signals. Given the measured velocity of the vehicle, this can be readily formulated as a least-squares problem. Vehicle velocity may be measured directly using an inertial unit or determined analytically by differencing consecutive position data. Note that since there are three unknown wave parameters (wave direction, period, and wavelength) a minimum of 3 non-collinear sample sets are required to determine the least-squares solution. For the constant heading/speed sampling approach, this requires 3 or more lines at different headings. For the arbitrary courser sampling approach, at least 3 different headings must be achieved during the sampling period.

The observed frequency of the principal wave component, $W_f(t)$, can be expressed as:

$$W_f(t) = \omega_p - k_p^T \alpha(t)$$

where:
- $\omega_p$ is the angular frequency of the principal wave
- $k_p$ is the wave number of the principal wave, a vector quantity with x and y components
- T is the transpose operator
- $\alpha(t)$ is the velocity of the vehicle, a vector quantity Given 3 or more sample pairs of $W_f(t)$ and $\alpha(t)$, it is well known to those skilled in the art to solve for $\omega_p$ and $k_p$ using the least-squares methods. Given the values of $\omega_p$ and $k_p$: the principal wave period is given by $2\pi/\omega_p$, the principal wave heading is given by $\tan^{-1}(k_y/k_x)$ where $k_x$ and $k_y$ are the x and y components of the wave number and $\tan^{-1}$ is the four quadrant inverse tangent. The principal wave's wavelength is given by $$(k_y^2 + k_x^2)^{-1/2}.$$

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A device for measurement of the parameters of the principal ocean wave component from a vessel moving in a predetermined pattern comprising:
   means for determining wave height on a moving vessel;
   means for determining vessel position;
   means for determining an accurate time;
   means for storing vessel position and wave height referenced to time;
   means for determining peak Doppler shifted wave frequency at predetermined intervals from the stored data;
   means for determining wave direction, period, and wavelength given the peak Doppler shifted wave frequencies and vessel velocities; and
   means for displaying wave direction, height, period, and wavelength.

2. A device, as in claim 1, wherein the means for determining wave height on a moving vessel is a wave height estimator.

3. A device, as in claim 1, wherein the means for determining vessel position is an electronic navigation system.

4. A device, as in claim 3, wherein the electronic navigation system is a global positioning satellite (G.P.S.) system.

5. A device, as in claim 3, wherein the electronic navigation system is an inertial navigation system.

6. A device, as in claim 1, wherein the means for determining an accurate time is a global positioning satellite (G.P.S.) system output.

7. A device, as in claim 1, wherein the means for determining an accurate time is a computer clock.

8. A device, as in claim 1, wherein the means for storing vessel position and wave height referenced to time is a computer.

9. A device, as in claim 1, wherein the means for determining peak doppler shifted wave frequency at predetermined intervals from the stored data is a doppler integrator.

10. A device, as in claim 9, wherein the Doppler integrator is a computer.

11. A device, as in claim 1, wherein the means for determining wave direction, period, and wavelength given the peak Doppler shifted wave frequencies and vessel velocities is a computer.

12. A device, as in claim 2, wherein the wave height estimator is comprised of:
   means for determining an altitude reference signal;
   means for determining a heave compensation signal; and
   means for combining the altitude reference signal and the heave compensation signal to obtain wave height.

13. A device, as in claim 12, wherein the means for determining an altitude reference signal is an altimeter reference unit.

14. A device, as in claim 13, wherein the altimeter reference unit is comprised of a ranging device, dropout compensator and high pass filter.

15. A device, as in claim 14, is further comprised of a vertical reference unit for correcting the measured range from the ranging device for its attitude.

16. A device, as in claim 12, wherein the means for determining a heave compensation signal is a heave sensor.

17. A device, as in claim 16, wherein the heave sensor is comprised of an accelerometer, a double integrator and a high pass filter.

18. A device, as in claim 12, wherein means for combining the altitude reference signal and the heave compensation signal to obtain wave height is a combiner.

19. A device for measurement of the parameters of the principal ocean wave component from a vessel moving in a predetermined pattern comprising:
   a wave height estimator for determining wave height on a moving vessel;
   an electronic navigation system for determining vessel position;
   a global positioning satellite (G.P.S.) system for determining an accurate time;
   a computer for storing vessel position and wave height referenced to time, determining peak Doppler shifted wave frequency at predetermined intervals from the stored data, and for determining wave direction, period, and wavelength given the peak Doppler frequencies and vessel velocities; and
   a display device for displaying wave direction, height, period, and wavelength.

20. A device for measurement of the parameters of the principal ocean wave component from a vessel moving in a predetermined pattern comprising:
   a wave height estimator comprised of a means for determining an altitude reference signal, a means for determining a heave compensation signal, and a means for combining the altitude reference signal and the heave compensation signal to obtain wave height;
   an inertial navigation system for determining vessel position;
   a global positioning satellite (G.P.S.) system for determining an accurate time;
   a computer for storing vessel position and wave height referenced to time, determining peak Doppler shifted wave frequency at predetermined intervals from the stored data, and for determining wave direction, period, and wavelength given the peak Doppler frequencies and vessel velocities; and
   a display device for displaying wave direction, height, period, and wavelength.

21. A device, as in claim 20, wherein the means for determining an altitude reference signal is an altitude reference unit.

22. A device, as in claim 21, wherein the altitude reference unit is comprised of:
   a ranging device;
   a dropout compensator; and
   a high-pass filter.

23. A device for measurement of the parameters of the principal ocean wave component from a vessel moving in a predetermined pattern comprising:
   a wave height estimator comprised of a means for determining an altitude reference signal, a means for determining a heave compensation signal, and a means for combining the altitude reference signal and the heave compensation signal to obtain wave height;
   a computer for combining the altitude reference signal and the heave compensation signal to obtain wave height;
   an electronic navigation system for determining vessel position;
   a global positioning satellite (G.P.S.) system for determining an accurate time;
   a computer for storing vessel position and wave height referenced to time, determining peak Doppler shifted wave frequency at predetermined intervals from the stored data, and for determining wave direction, period, and wavelength given the peak Doppler frequencies and vessel velocities; and a display device for displaying wave direction, height, period, and wavelength.

24. A device for measurement of the parameters of the principal ocean wave component from a vessel moving in a predetermined pattern comprising:

- a wave height estimator comprised of a ranging device, a dropout compensator and a high-pass filter for determining an altitude reference signal;
- a heave sensor for determining a heave compensation signal;
- a computer for combining the altitude reference signal and the heave compensation signal to obtain wave height;
- a global positioning satellite (G.P.S.) system for determining vessel position and an accurate time;
- a computer for storing vessel position and wave height referenced to time, determining peak Doppler shifted wave frequency at predetermined intervals from the stored data, and for determining wave direction, period, and wavelength given the peak doppler frequencies and vessel velocities; and
- a display device for displaying wave direction, height, period, and wavelength.

25. A method for measurement of the parameters of the principal ocean wave component from a vessel moving in a predetermined pattern comprising:

- determining wave height on a moving vessel;
- determining vessel position;
- determining an accurate time;
- storing vessel position and wave height referenced to time;
- determining peak Doppler shifted wave frequency at predetermined intervals from the stored data;
- determining wave direction, height, period, and wavelength given the peak doppler frequencies and vessel velocities; and
- displaying wave direction, height, period, and wavelength.

* * * * *

UNITED STATES PATENT AND TRADEMARK OFFICE
CERTIFICATE OF CORRECTION

PATENT NO. : 6,382,022 B1
DATED : May 7, 2002
INVENTOR(S) : Martinez et al.

It is certified that error appears in the above-identified patent and that said Letters Patent is hereby corrected as shown below:

<u>Title page,</u>
Item [74], *Attorney, Agent or Firm*, "John G. Mills" should read -- John Gladstone Mills III --

Signed and Sealed this

Sixth Day of July, 2004

JON W. DUDAS
*Acting Director of the United States Patent and Trademark Office*